United States Patent Office 3,511,794
Patented May 12, 1970

3,511,794
POLYVINYL HALIDE COMPOSITION CONTAINING AS A PLASTICIZER A DESULFURIZED FURFURAL EXTRACT
Jacques D. Robinson, Alvin, Tex., assignor to Monsanto Company, St. Louis, Mo., a corporation of Delaware
No Drawing. Filed June 9, 1964, Ser. No. 373,843
Int. Cl. C08f 45/52; C08k 1/62
U.S. Cl. 260—33.6
16 Claims

ABSTRACT OF THE DISCLOSURE

A polyvinyl halide containing composition, method for preparing such composition and a method for plasticizing a polyvinyl halide. The composition comprises a vinyl halide polymer and a petroleum based hydrocarbon fraction which is obtained by the solvent extraction with furfural, of a high-boiling petroleum-derived cracking residue, subjecting the aromatic extract obtained therefrom to catalytic treatment in the presence of a desulfurization catalyst and distilling the desulfurized product to obtain a fraction having a boiling range a substantial portion of which is above 120° C. at 0.05 mm. Hg. The method of preparing the above polymer composition comprises mixing the above described petroleum based hydrocarbon fraction with a vinyl halide polymer.

---

The present invention relates to polymer compositions. More particularly, the present invention relates to vinyl halide polymer compositions containing particular petroleum-derived components.

Polyvinyl halides, as well as many of their copolymers, are inherently brittle in character. To overcome this brittleness and impart commercially desirable properties to these materials, it is generally necessary to incorporate plasticizers in the polymeric compositions. For many utilities, however, it is necessary to add relatively large proportions of plasticizer to the polymer to obtain the desired degree of flexibility and plasticity. The most widely accepted and effective plasticizers presently known for polyvinyl halide compositions are the organic esters such as dioctylphthalate, dibutylphathalate and the like. These plasticizing compounds are relatively expensive and, in some instances, difficult to obtain, thus, many possible utilities for polyvinyl halide compositions are prohibited.

In the search for less expensive and more available plasticizers for vinyl halide polymers, various petroleum- and coal tar-derived fractions have been investigated. Generally, these investigations have developed, at best, petroleum-derived fractions usable as secondary plasticizers or plasticizers which are usable in combination with the above mentioned organic ester primary plasticizers. For instance U.S. Pat. No. 2,580,290 teaches the use of high molecular weight hydrocarbons derived or extracted from mineral oil distillates or residues by the use of selective solvents such as $SO_2$, $SO_2$-benzole, alcohols, furfural and phenol in combination with an organic ester polyvinyl chloride plasticizing compound. However, these prior art petroleum-derived fractions have for the most part been found unsuitable as primary plasticizers for vinyl halide polymers. Also, in many instances, they are found unsuitable even as secondary plasticizers or extenders. Generally, the petroleum-derived fractions have been found to be incompatible with the polymer composition and to exude from the polymer composition on aging, thus making them unsuitable as plasticizers or even as extenders. Also, many of the petroleum-derived fractions have been found to contain undesirable amounts of impurities, particularly sulfur bearing compounds which impart undesirable odor and, in many instances, color characteristics to the polymer compositions.

Because of the wide range of uses to which vinyl halide polymers may be put and the wide variety of properties necessary therefor, the primary requisites of a good plasticizer, whether primary or secondary is complete compatability with the plastic material and freedom from imparting undesirable odor or colors to the composition.

It is an object of the present invention to provide a petroleum-derived fraction suitable as a plasticizer for vinyl halide polymers. It is also an object of the present invention to provide a petroleum-derived fraction and a method for obtaining this fraction, which fraction when combined with vinyl halide polymers does not exude from the resulting composition. Another object of the present invention is to provide new and useful compositions comprising vinyl halide polymers and a particular petroleum-derived fraction and a method of preparing said compositions. Additional objects will become apparent from the following description of the invention herein disclosed.

The present invention which fulfills these and other objects comprises a composition comprising a vinyl halide polymer and a petroleum-derived hydrocarbon fraction obtained by the solvent extraction with furfural of a high boiling petroleum-derived cracking residue, subjecting the extract obtained therefrom to catalytic treatment in the presence of a desulfurization type catalyst, distilling the product of the catalytic treatment to obtain a fraction having a boiling range a substantial portion of which is above 120° C. at 0.05 mm. Hg and having an index of refraction at 20° C. of greater than 1.64. These compositions are useful as coating and molding compositions.

The petroleum-derived fraction of the present invention has been found to be quite compatible with vinyl halide polymers. Furthermore, the compositions of the present invention have been found to have no undesirable color or odor characteristics as a result of incorporation therein of the petroleum-derived fractions of the present invention.

The term "polymer" as used herein, refers not only to homopolymers but also to copolymers. For example, a polyvinyl chloride and a vinyl chloride-vinyl acetate copolymer are equally within the meaning of the term "polymer" as used herein.

The high boiling petroleum-derived cracking residue, hereinafter referred to as "fractionator bottoms," is the bottoms or residue fraction obtained from the vacuum distillation of the cracked oil product resulting from the thermal or catalytic cracking of conventional cracking feed stocks, preferably, at 400 to 750° C. In such cracking operations, relatively low pressures, varying from atmospheric to 100 p.s.i.g. are most often employed. A particularly preferred fractionator bottoms is that resulting from the fluid catalytic cracking of petroleum oil at 400 to 500° C. To obtain the fractionator bottoms used as the initial feed in the present invention, the cracked oil products resulting from the cracking operation are subjected to fractionation generally at reduced pressures, and the relatively high boiling residue fraction, boiling above 300° C. at atmospheric pressure recovered as the fractionator bottoms. This fractionator bottoms is the material which is extracted with furfural solvent and subjected to catalytic treatment in the presence of a desulfurization type catalyst in order to obtain the hydrocarbon plasticizer fraction of the present invention.

The high boiling residues or "fractionator bottoms" from which the petroleum-derived plasticizers are obtained usually contain significant amounts of sulfur bearing compounds and other impurities, often containing as high as 5.0 to 8.0 weight percent of sulfur. This sulfur is generally extracted from the fractionator bottoms by the furfural and thus concentrated in the furfural extract It is primarily for the removal of this sulfur so as to vent discoloration and unpleasant odors in the polymer compositions that the furfural extract is subjected to the catalytic action of a desulfurization type catalyst. However, catalytic treatment of the furfural extract further increases the compatability of the extract by, it is believed, decreasing the aliphatic content of the extract.

In order to demonstrate, as well as to further describe the present invention, the following example is presented. This example is in no way to be construed as limiting the present invention.

EXAMPLE

A fractionator bottoms obtained from the fluid catalytic cracking of petroleum and having a density of approximately 0.961 at 20° C., a refractive index of 1.562 at 20° C., a viscosity index of 53.72 and a sulfur content of 3 percent by weight, was thoroughly agitated with furfural in a solvent to fractionator bottoms volume ratio of 2. The mixture was allowed to separate into an extract and a raffinate phase which were then separated. This procedure was substantially repeated on the raffinate phase to obtain a second extract phase. This procedure was then repeated a third time on the raffinate of the second stage extraction to obtain a third extract phase. All three extraction stages were carried out at room temperature, or 75° F. The three extract phases were combined and subjected to fractional distillation at reduced pressure to distill the solvent from the extract. The aromatic extract remaining as bottoms from this distillation represented approximately 40 weight percent of the fractionator bottoms. This extract contained 4.8 weight percent sulfur and had an initial boiling point of 65° C. at 0.42 mm. Hg and 50 volume percent boiled below 198° C. at 0.4 mm. Hg. The average weight percent aliphatic substituents in the aromatic extract was approximately 36. The aromatic extract was passed into contact with a disulfurization type catalyst concurrently with hydrogen in a hydrogen to aromatic extract mole ratio of 10:1. The catalyst was one comprised of approximately 3 percent by weight of CoO, 15 percent by weight of $MoO_3$ and 5.0 percent by weight of $SiO_2$ on an alumina support. The temperature of the catalytic treatment was approximately 425° C. and the pressure 675 p.s.i.g Upon completion of the catalytic treatment, the aromatic extract was found to contain approximately 2.0 percent by weight of sulfur. The average aliphatic substituent content of the catalytically treated aromatic extract was approximately 30.4 percent by weight. This product of the catalytic treatment was then distilled under vacuum and a residue recovered which residue boiled above 121° C. at 0.05 mm. Hg. This residue had an average aliphatic substituent content of 21.3 percent by weight. This residue was then thoroughly mixed with a polyvinyl chloride having a specific gravity of 1.4, a bulk density of 0.48—grams/cc. and known commercially as Opalon 300 and manufactured by Monsanto Company. The extract represented approximately 40 percent by weight of the extract—PVC composition. Next, the mixture was placed in an oven for 10 minutes at 168° C. and then thoroughly agitated. After this final mixing the mixture was placed in an electrically heated Carver press where it was molded into film at 160° C. and 10,000 p.s.i.

The plastic composition prepared above had no undesirable odor and was of an acceptable clear-amber color. Further, this composition prepared in accordance with the present invention is found to meet acceptable standards as to flexibility and plasticity as represented by tensile strength and elongation.

In order to demonstrate the improvement resulting from the composition of the present invention in overcoming the hereinabove described deficiencies of previously known petroleum-derived fractions, two petroleum-derived plasticizer-polyvinyl chloride compositions were subjected to the loop compatibility test described below to determine the compatibility of petroleum-derived plasticizers incorporated therein with the polyvinyl chloride. One of the compositions was that described above which was prepared in accordance with the present invention. The other was one prepared in the manner described above from a furfural extract of the fractionator bottoms of the above example which had not been desulfurized. As a result, it was found that the petroleum derived plasticizer of the present invention was compatible with the polyvinyl chloride in this test while the furfural extract exuded from the composition within one day.

Loop compatibility test

This test method provides a relatively severe test of the compatibility of a plasticizer in a polymer composition by determining the degree of exudation of a plasticizer on the inside of a polymer loop. To carry out this test a 65-mil, ½-inch wide strip of a plasticized polymer is placed under stress by folding it into a U-shaped loop of about 1¼ inches inside width. The U-shaped loop is placed on its side and placed under sufficient stress to maintain the U shape. The test strip is then maintained at 23° C. and 50 percent relative humidity for the testing period. The inside of the loop is examined for general testing purposes, at 4 hours, 1 day and 1 week. The results of the test, based on degree of exudation, is recorded at each of these test periods. If there is no exudation, then the plasticizer is said to be compatible. If there is exudation of plasticizer, it is recorded according to the period of time before exudation occurs.

In the practice of the present invention, the furural extraction procedure is usually carried out at a temperature of 10 to 200° C. and at pressures ranging from sub-atmospheric up to 200 p.s.i.g. and higher. It is preferred that the extraction temperature be at or near room temperature or somewhat more broadly, within the range of 15 to 40° C. Preferred pressures for the solvent extraction procedure are substantially at atmospheric or within the range of from atmospheric pressure up to 10 to 15 p.s.i.g.

The ratio of furfural solvent to fractionator bottoms useful in obtaining the petroleum-derived plasticizer of the present invention is usually within the range of 0.1 to 10.0 volumes of solvent per volume of feed. A preferred solvent-to-feed volume ratio is found within the range of 0.2:1 to 4:1.

The manner in which the furfural solvents are contacted with the fractionator bottoms to provide the extracts useful in preparing the plasticizers of the present compositions may be by any of the conventional methods. The prime requirement is that there be a thorough and intimate contact between feed and solvent in order to maximize the efficiency of the solvent. The extraction may be carried out by several separate extraction stages, as illustrated by the example or the extraction may be carried out in a multistage extraction column. Generally, at least two extraction stages are utilized to obtain the hydrocarbon fraction useful in preparing petroleum-derived plasticizers in accordance with the present invention.

The method whereby the material extracted from the fractionator bottoms is obtained from the loaded solvent extract is in most instances by simple vacuum distillation. Usually a simple flash distillation apparatus of one to three theoretical plate efficiency will suffice. In order to avoid decomposition and/or polymer formation in the solvent-extract mixture it generally is preferable to conduct this distillation step at reduced pressures to avoid high temperatures. It is easily within the ability of those skilled in the art to determine the proper pressure necessary to prevent decomposition or polymer formation in the recovery of the extract from the solvent.

The catalysts most useful in catalytically treating the furfural extract in accordance with the present invention are those generally of the desulfurization type and include such catalytic agents as such metals, and their oxides and sulfides, as cobalt, nickel, zinc, iron, molybdenum, chromium, lead, beryllium, cadmium, vanadium, manganese, tatalum, tungsten, titanium, platinum, columbium, scandium, thorium, aluminum, zirconium, tin, copper and the like. These catalytic agents may be used alone or in combinations of two or more. Most often the catalytic agent is one of the oxides or sulfides of a metal from Group VIII or the left hand column of Group VI of the Periodic Table. Many of these catalytic agents are useful in the present invention only when supported on suitable carriers such as the oxides or combinations of the oxides of alumina, magnesium, silicon, zirconium, titanium, thorium and the like. Usually, the catalytic agents are supported on a carrier such as silica, alumina, or silica-alumina. A particularly preferred catalyst for use in the present invention is one comprised of cobalt or molybdenum or a combination thereof or the oxides thereof and a silica-alumina support.

It is generally necessary to carry out the catalytic treatment in the presence of hydrogen, therefore, hydrogen is usually introduced concurrently with the aromatic extract into contact with the desulfurization catalyst. The amount of hydrogen is usually sufficient to produce a mole ratio of hydrogen to aromatic extract of no less than 2:1. It is somewhat preferred, however, that the amount of hydrogen used be such as to produce a mole ratio of hydrogen to aromatic compound of 5:1 to 15:1.

The temperature within the catalytic treating zone is generally within the range of 350 to 500° C. Temperatures of 400 to 450° C. are usually preferred however. The pressure within the catalytic treating zone is most often within the range of 550 to 900 p.s.i.g. with pressures of 600 to 750 p.s.i.g. preferred. A residence time of the reactants within the catalytic treating zone of 10 to 300 seconds is usually adequate with 120 to 210 seconds preferred.

The catalytic treatment of the furfural extract of the fractionator bottoms in accordance with the present invention accomplishes two ends. Sulfur, which imparts undesirable color and odor characteristics to polymeric compositions plasticized with petroleum based plasticizers, is reduced to more desired levels by the catalytic treatment. Further, the concentration of aliphatic components, usually as substituents to aromatic rings, is significantly reduced by the catalytic treatment. The aliphatic components produce incompatibility of the plasticizer with the polymer. At present, the mechanism by which the aliphatic concentration is reduced by the catalytic treatment is not known, though it is possibly a combination of dealkylation, cracking, dehydrogenation and cyclization.

The product of the catalytic treating zone is subjected to distillation to obtain the petroleum-derived plasticizers of the present invention. The distillation should be conducted such that a bottom fraction is obtained, a substantial portion of which has a boiling range above 120° C. at 0.05 mm. Hg. Such a fraction will in most instances have no less than 80 percent and preferably no less than 100 percent of said fraction boiling above this temperature. The manner in which the distillation is carried out is well within the ability of those skilled in the art. It may be carried out at atmospheric pressures or at subatmospheric pressures. Because of its relatively high boiling nature, it is generally preferred that subatmospheric pressure be employed. This fraction so obtained will generally have a refractive index at 20° C. greater than 1.64.

The polymeric compositions of the present invention usually contain 0.2 to 70 percent by weight of the petroleum-derived plasticizers of the present invention. Preferably, however, the polymeric compositions of the present invention contain 0.5 to 50 percent by weight of the present petroleum-derived plasticizers. It is within the scope of the present invention that other plasticizers may be used with the petroleum-derived plasticizers of the present compositions to alter the polymer properties for certain specific end uses. If a second plasticizer is used in the present compositions, it is used in an amount equivalent to 0.1 to 10 parts by weight per part by weight of the plasticizers of the present invention. Preferably, however, 0.5 to 5 parts by weight per part by weight of the plasticizers of the present invention is used.

The polymeric component of the compositions of the present invention is a homopolymer of a vinyl halide such as vinyl bromide, vinyl chloride, or vinyl fluoride, or a copolymer of a vinyl halide and other polymerizable compounds, i.e., thermoplastic polymers composed essentially of vinyl halide units and containing only the amount of halogen contained in the polymer as formed by the polymerization of the monomer units. Of these, the most useful compositions are obtained with either polyvinyl chloride or copolymers of vinyl chloride and another copolymerizable compound, particularly vinyl acetate. Particularly suitable compositions are obtained with polyvinyl chloride homopolymer as well as with the copolymers of vinyl chloride either with 5 to 30 percent vinyl acetate or with up to about 50 percent vinylidene chloride. Other copolymers include a vinyl halide copolymerized with another compound containing the polymerizable group,

or other polymerizable group such as for example, vinyl formate, vinyl acetate, vinyl propionate, vinyl butyrate, vinylidene dichloride, styrene, methyl acrylate, ethyl acrylate, butyl acrylate, methyl methacrylate, ethyl ethacrylate, allyl acetate, allyl chloride, allyl formate, vinyl chloracetate, allyl trichloracetate, methallyl acetate, chlorostyrene, dichlorostyrene, acrolein, acrylonitrile, methacrolein, methacrylonitrile, methacrylic acid, methyl vinyl ketone, methyl isopropenyl ketone, methyl vinyl ether, methyl allyl ether, and the like. It is preferred that the copolymers be derived from a mixture wherein the vinyl halide is the major constituent thereof and more preferably where it is the predominate constituent, i.e., more than 90 percent of the mixture. If desired, the copolymers can be obtained from the mixture of the vinyl halide with two or more other polymerizable compounds. In its preferred embodiment, the compositions of the present invention contain vinyl chloride homopolymers and/or copolymers as the vinyl halide.

Other suitable vinyl halide copolymers are those obtained by copolymerizing vinyl chloride with another compound containing two of the polymerizable vinylidene groups as are present, for example, in divinyl benzene, divinyl adipate, allyl methacrylate, diallyl phthalate, etc. The divinylidene containing compound is used in sufficiently small quantity so that the copolymer remains thermoplastic and is not thermosetting to an infusible resin. The amount of divinylidene-containing compound used in admixture is usually less than about 1 percent to obtain a thermoplastic polymer. When a thermosetting polymer is desired, a larger quantity of the divinylidene-containing compound is used.

All of the thermoplastic polymers employed in the compositions of the invention are solid materials at normal temperature (20° C.) and consequently are of high molecular weight. In general the polymers have molecular weights of about 4,000 to 90,000.

While the petroleum-based plasticizers disclosed herein can be used alone as a plasticizer for the polymer, it is desirable in some cases to employ other substances as coplasticizers with this material. The substances useful as plasticizers in combination with the present petroleum-based plasticizers are esters compatible with the vinyl halide polymers. By compatible is meant those esters which form homogeneous compositions with the polymer. The compatible esters which are used boil above 250° C. or above about 125° C. under 1 mm. Hg pressure. For this purpose the phosphoric acid esters of phenols and aliphatic alcohols such as tricresyl phosphate, tritolyl phate, trioctyl phosphate, and tributoxy ethyl phosphite are particularly suitable. The alkyl and alkyloxyyl esters of dicarboxylic acids having the required high ling point are also a preferred class of conjunctive sticizers. Among representative examples of suitable rs for use in the invention are such compounds as diyl phthalate, di-isobutyl phthalate, diamyl phthalate, ctyl phthalate, dibenzyl phthalate, diallyl phthalate, dithylallyl phthalate, butylin, dibutyl digylcollate, diyl adipate, dicyclohexyl phthalate, dicyclopentyl halate, dibutyl sebacate, dibenzyl sebacate, dioctyl arate, dioctyl maleate, butyl acetylricinoleate, butyl hallyl, butyl glycollate, triehtylene glycol dioctanoate, utyl Cellosolve phthalate, dibutyl carbitol phthalate, diethylene glycol sebacate, and the like. Preferably, compatible esters are those boiling above 300° C. or ve 140° C. at 1 mm. Hg pressure.

he manner of incorporating the herein disclosed novel ticizers into the vinyl halide polymer and/or copoly- compositions of the present invention may be by any wn method. The components of the present invention r be mixed by mechanical mixing or by solution of the meric material and the hydrocarbon fraction in a ual solvent followed by volatilization of the solvent. erally, it is necessary to mix the materials at an ated temperature, usually 130 to 180° C. for a short od of time. A preferred mixing temperature is within range of 150 to 170° C. On cooling, the polymer comtions of the present invention are ready for their ultie use.

/hat is claimed is:

. A composition which comprises a vinyl halide polyand a petroleum based hydrocarbon fraction obtained the solvent extraction of a high boiling petroleumved cracking residue with furfural, subjecting the aroic extract obtained therefrom to catalytic treatment in presence of a catalyst of the desulfurization type, dising the desulfurized product to obtain a fraction having iling range a substantial portion of which is above ° C. at 0.05 mm. Hg.

. The composition of claim 1 wherein the vinyl halide mer is a vinyl halide homopolymer.

. The composition of claim 2 wherein the vinyl halide opolymer is a vinyl chloride polymer.

. The composition of claim 1 wherein the vinyl halide mer is a vinyl halide copolymer.

. The composition of claim 1 wherein the high boilpetroleum-derived cracking residue is obtained as a oms fraction from the distillation to an overhead temture of 300° C. at atmospheric pressure of the cracked roduct obtained by the catalytic cracking of petroleum t 400 to 500° C.

. The composition of claim 5 wherein the cracked oil luct results from fluid catalytic cracking.

. The composition of claim 1 wherein the amount of hydrocarbon fraction in the composition is approximely 0.2 to 70 percent by weight.

. The composition of claim 1 wherein the petroleum d hydrocarbon fraction is one at least 80 percent by ht of which boils above 120° C. at 0.05 mm. Hg.

9. The composition of claim 8 wherein the hydrocarbon fraction has a refractive index at 20° C. greater than 1.64.

10. The composition of claim 1 wherein catalytic treatment is carried out in the presence of a catalyst selected from the group consisting of cobalt and its oxide, molybdenum and its oxide and combinations thereof deposited on a silica-alumina support.

11. The composition of claim 1 wherein catalytic treatment is carried out at a temperature within the range of from 350 to 500° C. and a pressure of 550 to 900 p.s.i.g. and in the presence of an amount of hydrogen sufficient to produce a hydrogen to aromatic extract mole ratio of no less than 2:1.

12. The method of preparing a polymer composition which comprises solvent extracting a high boiling petroleum-derived cracking residue with furfural, recovering an aromatic extract therefrom, catalytically treating said aromatic extract in the presence of a catalyst of the desulfurization type and distilling said aromatic extract to obtain a fraction having a boiling range a substantial portion of which is above 120° C. at 0.05 mm. Hg and admixing said fraction with a vinyl halide polymer.

13. The method of claim 12 wherein the high boiling petroleum-derived cracking residue is obtained as a bottoms fraction from the distillation to an overhead temperature of 300° C. at atmospheric pressure of the cracked oil product obtained by the catalytic cracking of petroleum oil at 400 to 500° C.

14. The method of claim 12 wherein the vinyl halide polymer is a vinyl chloride polymer.

15. The method of claim 12 wherein catalytic treatment is carried out in the presence of a catalyst selected from the group consisting of cobalt and its oxide, molybdenum and its oxide and combinations thereof deposited on a silica-alumina support, at a temperature within the range of from 350 to 500° C. and a pressure of 550 to 900 p.s.i.g. and in the presence of an amount of hydrogen sufficient to produce a hydrogen to aromatic extract mole ratio of no less than 2:1.

16. A method of plasticizing a polyvinyl halide which comprises mixing a petroleum based plasticizing hydrocarbon fraction with said polyvinyl halide and thereby obtaining a plasticized polymeric composition, said petroleum-based hydrocarbon fraction obtained by the solvent extraction of a high boiling petroleum derived cracking residue with furfural to obtain an aromatic extract, subjecting said aromatic extract to catalytic treatment in the presence of a catalyst of the desulfurization type and then to distillation to obtain a high boiling petroleum-derived hydrocarbon fraction having a boiling range a substantial portion of which is above 120° C. at 0.05 mm. Hg.

References Cited

UNITED STATES PATENTS

| | | | |
|---|---|---|---|
| 2,498,453 | 2,1950 | Schaerer | 260—33.6 |
| 2,580,290 | 12/1951 | Fawcett et al. | 260—33.6 |
| 2,698,280 | 12/1954 | Hersberger et al. | 260—33.6 |
| 2,911,354 | 11/1959 | Holder et al. | 208—33.6 |
| 2,948,695 | 8/1960 | Ford et al. | 260—33.6 |

MORRIS LIEBMAN, Primary Examiner